(12) United States Patent
Isoya et al.

(10) Patent No.: US 12,298,164 B2
(45) Date of Patent: May 13, 2025

(54) PHYSICAL QUANTITY DETECTION DEVICE

(71) Applicant: HITACHI AUTOMOTIVE SYSTEMS, LTD., Hitachinaka (JP)

(72) Inventors: Yuki Isoya, Hitachinaka (JP); Hiroaki Hoshika, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 940 days.

(21) Appl. No.: 16/973,284

(22) PCT Filed: Apr. 23, 2019

(86) PCT No.: PCT/JP2019/017125
§ 371 (c)(1),
(2) Date: Dec. 8, 2020

(87) PCT Pub. No.: WO2019/239726
PCT Pub. Date: Dec. 19, 2019

(65) Prior Publication Data
US 2021/0247219 A1 Aug. 12, 2021

(30) Foreign Application Priority Data

Jun. 13, 2018 (JP) ................. 2018-112934

(51) Int. Cl.
| | |
|---|---|
| *G01F 1/696* | (2006.01) |
| *G01F 1/684* | (2006.01) |
| *G01F 1/688* | (2006.01) |
| *G01F 15/04* | (2006.01) |

(52) U.S. Cl.
CPC ............ *G01F 1/696* (2013.01); *G01F 1/6842* (2013.01); *G01F 1/688* (2013.01); *G01F 15/04* (2013.01)

(58) Field of Classification Search
CPC ........ G01F 1/696; G01F 1/6842; G01F 1/688; G01F 15/04; G01F 15/046; G01F 15/003
See application file for complete search history.

(56) References Cited

U.S. PATENT DOCUMENTS

| | | | | |
|---|---|---|---|---|
| 4,005,603 A | * | 2/1977 | Golahny | ............... G01F 15/024 |
| | | | | 73/861.03 |
| 6,381,548 B1 | | 4/2002 | Van Marion | |
| | | (Continued) | | |

FOREIGN PATENT DOCUMENTS

| | | | |
|---|---|---|---|
| CN | 206234095 U | * | 6/2017 |
| JP | H08110251 A | * | 4/1996 |
| | (Continued) | | |

OTHER PUBLICATIONS

International Search Report with English translation and Written Opinion issued in corresponding application No. PCT/JP2019/017125 dated Aug. 13, 2019.

*Primary Examiner* — Douglas Kay
(74) *Attorney, Agent, or Firm* — Foley & Lardner LLP

(57) ABSTRACT

It is possible to reduce a degradation in accuracy after switching of a heating state or after change of the flow rate. A physical quantity detection device includes a flow rate measuring element which is equipped with a heating element and measures a flow rate of a measurement target fluid; a heating element control unit which switches a control state of the heating element to one of a heat generation state or a heat generation suppression state; and a signal processing unit which includes a buffer and a frequency analysis block, and processes a measured value of the flow rate measuring element, using a main frequency calculated by the frequency analysis block, in which the measured value for a past predetermined period is recorded in the buffer, the frequency analysis block calculates the main frequency by performing a frequency analysis of the measured value recorded in the (Continued)

buffer, when an occurrence of an event is detected, the signal processing unit performs a calculation, using the main frequency calculated immediately before for a predetermined period from the occurrence of the event, and the event is a sudden change in the measured value and switching of the control state performed by the heating element control unit.

9 Claims, 12 Drawing Sheets

(56) References Cited

U.S. PATENT DOCUMENTS

| | | | |
|---|---|---|---|
| 11,237,035 B2* | 2/2022 | Isoya | G01F 1/698 |
| 2004/0002821 A1 | 1/2004 | Kanke | |
| 2008/0092645 A1* | 4/2008 | Kanke | G01F 1/6845 |
| | | | 73/204.14 |
| 2014/0224004 A1 | 8/2014 | Ariyoshi | |
| 2017/0286209 A1* | 10/2017 | Heroor | G06F 11/0727 |

FOREIGN PATENT DOCUMENTS

| | | | | |
|---|---|---|---|---|
| JP | 2001-183203 A | | 7/2001 | |
| JP | 2004-020454 A | | 1/2004 | |
| JP | 2004053127 A | * | 2/2004 | ............. F24F 11/30 |
| JP | 2014-153290 A | | 8/2014 | |
| JP | 2016-109625 A | | 6/2016 | |
| WO | WO-2018074120 A1 | * | 4/2018 | ............. F02D 41/18 |

* cited by examiner

PHYSICAL QUANTITY DETECTION DEVICE

TECHNICAL FIELD

The present invention relates to a physical quantity detection device.

BACKGROUND ART

A physical quantity detection device that heats a heating element and measures a flow rate is known. PTL 1 discloses an air flow meter equipped with a passage formation member that forms a passage through which a part of intake air sucked into an engine passes, a flow rate sensor that measures an intake air flow rate passing through the passage, and an intake air temperature sensor that measures an intake air temperature, in which the air flow meter includes a second temperature sensor that is provided independently of the intake air temperature sensor and measures the temperature at a location affected by heat transmitted to the passage formation member, and a response compensating means for compensating for a response delay of an output difference between an intake air temperature signal measured by the intake air temperature sensor and a second temperature signal measured by the second temperature sensor, on the basis of a flow rate signal measured by the flow rate sensor, and the intake air temperature signal measured by the intake air temperature sensor is corrected on the basis of an output difference compensated by the response compensating means.

CITATION LIST

Patent Literature

PTL 1: Japanese Unexamined Patent Publication No. 2016-109625

SUMMARY OF INVENTION

Technical Problem

In the invention described in PTL 1, a measurement accuracy is degraded after a heating state is switched or after a flow rate is changed.

Solution to Problem

A physical quantity detection device according to a first aspect of the present invention includes a flow rate measuring element which is equipped with a heating element and measures a flow rate of a measurement target fluid; a heating element control unit which switches a control state of the heating element to one of a heat generation state or a heat generation suppression state; and a signal processing unit which includes a buffer and a frequency analysis block, and processes a measured value of the flow rate measuring element, using a main frequency calculated by the frequency analysis block, in which the measured value for a past predetermined period is recorded in the buffer, the frequency analysis block calculates the main frequency by performing a frequency analysis of the measured value recorded in the buffer, when an occurrence of an event is detected, the signal processing unit performs a calculation, using the main frequency calculated immediately before for a predetermined period from the occurrence of the event, and the event is a sudden change in the measured value and switching of the control state performed by the heating element control unit.

Advantageous Effects of Invention

According to the present invention, it is possible to reduce an accuracy degradation after switching the heating state or after change of the flow rate.

DESCRIPTION OF EMBODIMENTS

First Embodiment

Figure 1:
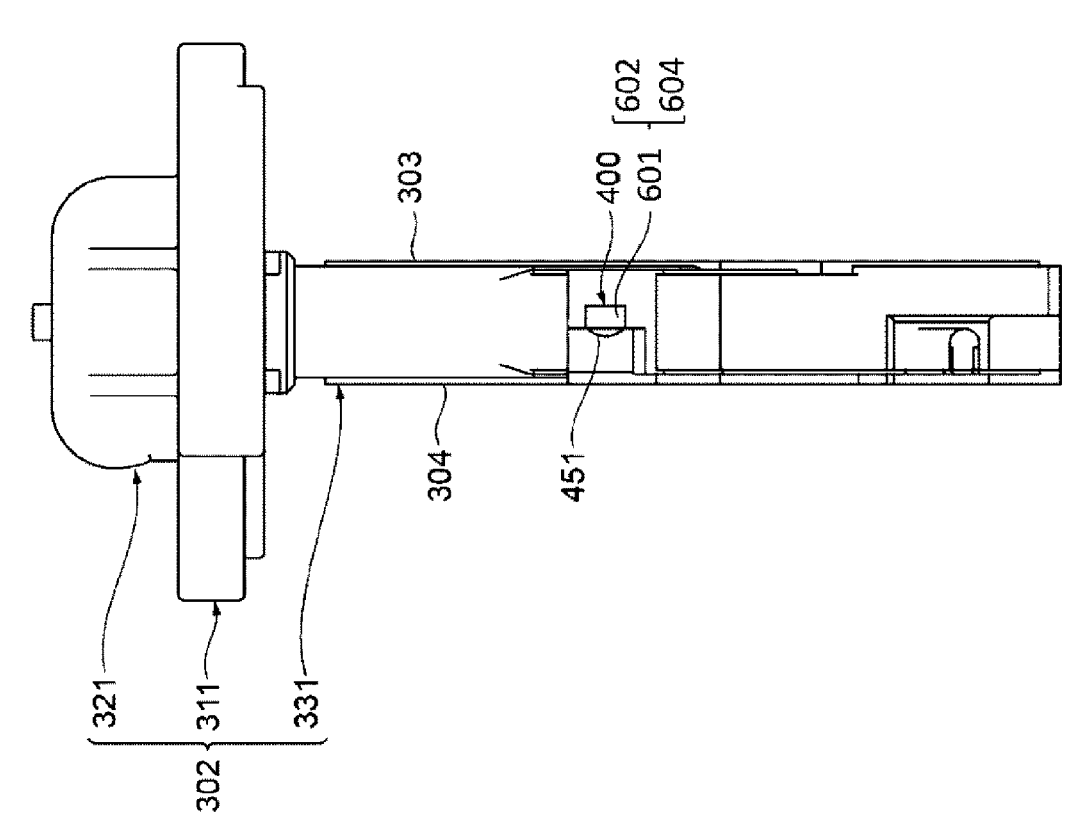
FIG. 1 is a cross-sectional view of a physical quantity detection device 300.

Hereinafter, a first embodiment of a physical quantity detection device will be described with reference to FIGS. 1 to 7 in the present embodiment, although the physical quantity detection device targets an intake air of an internal combustion engine, the measurement target of the physical quantity detection device 300 is not limited thereto.
(Hardware Configuration)
FIG. 1 is a cross-sectional view of the physical quantity detection device 300. The physical quantity detection device 300 includes a housing 302, a front cover 303, and a back cover 304. The housing 302 is formed by molding a synthetic resin material. The housing 302 has a flange 311 for fixing the physical quantity detection device 300 to an intake pipe through which intake air of an internal combustion engine flows, an external connection unit 321 protruding from the flange 311 and having a connector for making an electrical connection to an electronic control unit (hereinafter, ECU) 200, and a measurement unit 331 extending to protrude from the flange 311 toward the center of the intake pipe. Various communication means can be used for communication between the physical quantity detection device 300 and the ECU 200, and for example, a LIN (Local Interconnect Network), which is a kind of onboard network, is used.

The measurement unit 331 is integrally provided with a circuit board 400 by insert molding when the housing 302 is molded. The circuit board 400 includes a flow rate detection circuit 601 that measures the flow rate of a measurement target gas, and a temperature detection unit 451 that detects the temperature of the measurement target gas. The flow rate detection circuit 601 includes a flow rate detection unit 602 and a processing unit 604. The flow rate detection unit 602 and the temperature detection unit 451 are disposed at positions exposed to the measurement target gas.

Figure 2:
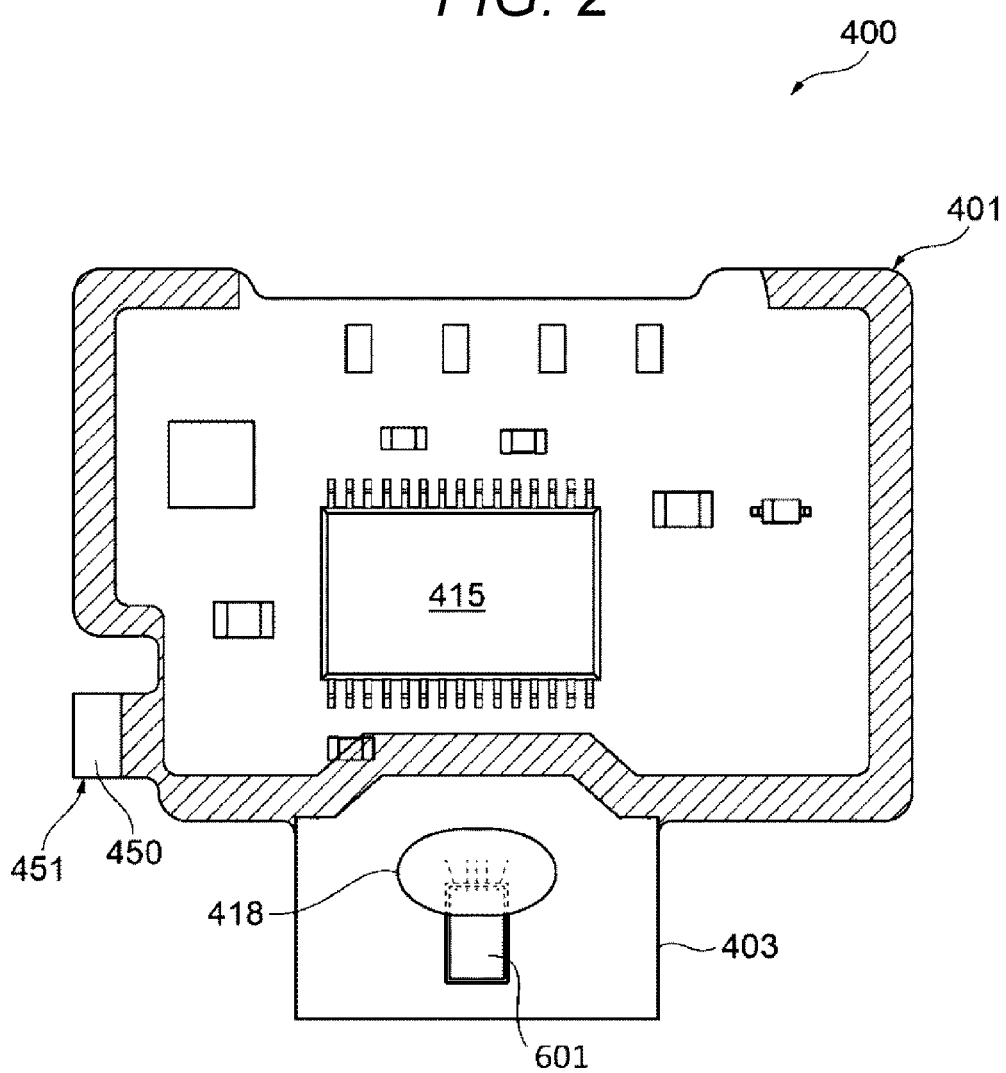
FIG. 2 is an enlarged view of a circuit board 400.

FIG. 2 is an enlarged view of the circuit board 400. The circuit board 400 includes a board main body 401, a first protrusion 403, and a second protrusion 450. A microcomputer 415 is mounted on the board main body 401, a flow rate detection circuit 601 coated with a synthetic resin material 418 is mounted on the first protrusion 403, and a temperature detection unit 451 is mounted on the second protrusion 450. The microcomputer 415 is connected to the flow rate detection circuit 601 and the temperature detection unit 451 by a signal line (not shown). The flow rate detection circuit 601 includes a heating element 608 to be described later, and measures the flow rate when the heating element 608 comes into contact with a measurement target fluid in a heat generation state. A pressure sensor and a humidity sensor, which are sensing elements, are provided on a back surface of the board main body 401.

(Functional Configuration)

Figure 3:
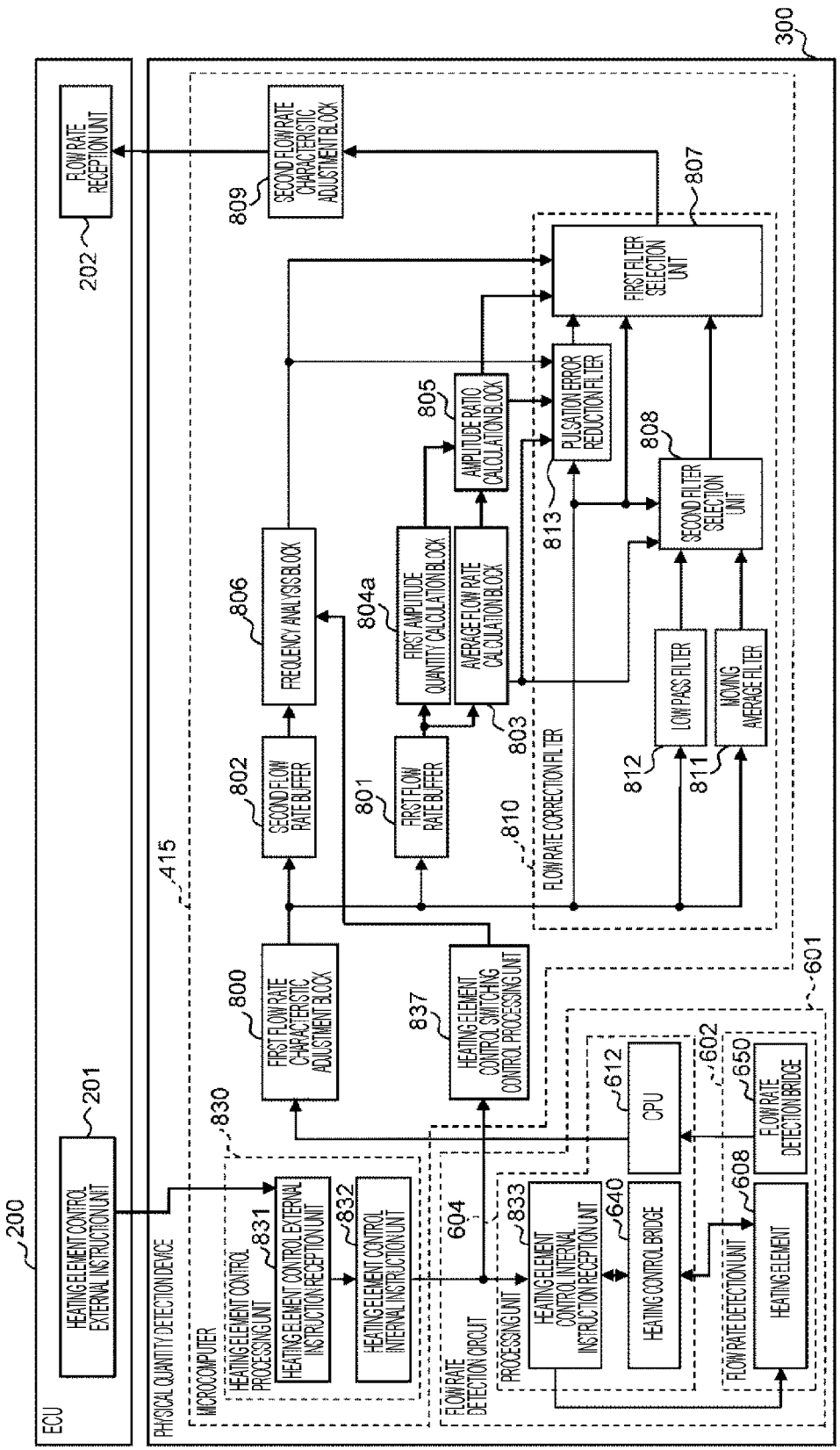
FIG. 3 is a diagram showing a configuration of an ECU 200 and a physical quantity detection device 300 according to a first embodiment.

FIG. 3 is a diagram showing the configurations of the ECU 200 and the physical quantity detection device 300.

(ECU200)

The ECU 200 connected to the physical quantity detection device 300 includes a heating element control external instruction unit 201 and a flow rate reception unit 202. The heating element control external instruction unit 201 operates the heating element control external instruction unit 201 by a predetermined operation algorithm to indicate the control state of the heating element 608 provided in the physical quantity detection device 300. Specifically, the heating element 608 is controlled to a heat generation state or a heat generation suppression state. However, the physical quantity detection device 300 outputs a measured value to the ECU 200 regardless of the control state of the heating element 608.

(Physical Quantity Detection Device 300)

The physical quantity detection device 300 includes a flow rate detection circuit 601, and a microcomputer 415 that processes the output value of the flow rate detection circuit 601. The functional configurations of the flow rate detection circuit 601 and the microcomputer 415 will be described below. Each function of the flow rate detection circuit 601 is realized by each hardware or software as described later. Each function of the microcomputer 415 is realized by a hardware circuit. However, the function of the microcomputer 415 may be realized by software processing.

(Flow Rate Detection Circuit 601)

The flow rate detection circuit 601 includes a processing unit 604 and a flow rate detection unit 602.

The processing unit 604 includes a heating element control internal instruction reception unit 833, a heat generation control bridge 640, and a CPU 612, which is a central arithmetic unit. The flow rate detection unit 602 includes a heating element 608 and a flow rate detection bridge 650. The flow rate detection circuit 601 controls the heating element 608 according to the instruction of the heating element control internal instruction unit 832 provided in the microcomputer 415, and outputs the measured value to the first flow rate adjustment block 800. However, the output of the measured value is performed regardless of the instruction content of the heating element control internal instruction unit 832.

The heating element control internal instruction reception unit 833 of the processing unit 604 is hardware that communicates with the heating element control processing unit 830. The heating element control internal instruction reception unit 833 causes the heat generation control bridge 640 to control the heating element 608 in accordance with the instructions of the heating element control internal instruction unit 832. Specifically, the heating element control internal instruction unit 832 gives an instruction to switch between the heat generation state of the control state and the heat generation suppression state. When the heating element control internal instruction reception unit 833 is instructed from the heating element control internal instruction unit 832 to switch to the heating state, the heating element control internal instruction reception unit 833 causes the heat generation control bridge 640 to control a calorific value of the heating element 608 so that the temperature of the measurement target gas becomes a predetermined temperature higher than an initial temperature, for example, rises by 100° C. This control is called "heat generation state" control.

When the heating element control internal instruction reception unit 833 is instructed from the heating element control internal instruction unit 832 to switch to the heat generation suppression state, the heating element control internal instruction reception unit 833 performs a control of not performing the heat generation of the heating element 608 using the heat generation control bridge 640. This control is called a control of "heat generation suppression state". Further, the heating element control internal instruction reception unit 833 controls the power supply to the heating element 608 according to the instruction of the heating element control internal instruction unit 832. Specifically, when the heat generation state is instructed, the heating element control internal instruction reception unit 833 supplies power to the heating element 608, and when the heat generation suppression state is instructed, the heating element control internal instruction reception unit 833 cuts off the power supply to the heating element 608.

The heat generation control bridge 640 of the processing unit 604 is a bridge circuit including four temperature measurement resistors. The heat generation control bridge 640 is heated by the heating element 608 via the measurement target gas, and the resistance value changes. When the heat generation state is instructed, the CPU 612 monitors the resistance value of the heat generation control bridge 640, and controls the calorific value of the heating element 608 so that the temperature of the measurement target gas becomes a predetermined temperature higher than the initial temperature, for example, rises by 100° C. When the heat generation suppression state is instructed, the CPU 612 controls the calorific value of the heating element 608 so as not to cause the heating element 608 to perform the heat generation. The CPU 612 realizes the above-described function by expanding and executing a program stored in a ROM (not shown) to a RAM (not shown). However, the CPU 612 may not perform any control when the heat generation suppression state is instructed.

The flow rate detection bridge 650 of the flow rate detection unit 602 is a bridge circuit including four temperature measurement resistors. The four temperature measurement resistors are disposed along the flow of the measurement target gas. Specifically, two temperature measurement resistors are disposed upstream of the heating element 608 in the flow path of the measurement target gas, and the other two temperature measurement resistors are disposed downstream of the heating element 608 in the flow path of the measurement target gas. Therefore, the temperature measurement resistor installed on the upstream side of the heating element 608 is cooled by the flow of the measurement target gas, and the temperature measurement resistor installed on the downstream side of the heating element 608 is warmed by the measurement target gas warmed by the heating element 608. The flow rate detection bridge 650 outputs a difference in temperature between the temperature measurement resistors as a potential difference.

(Microcomputer 415)

The microcomputer 415 includes a heating element control processing unit 830, a heating element control switching control processing unit 837, a first flow rate characteristic adjustment block 800, a first flow rate buffer 801, a second flow rate buffer 802, an average flow rate calculation block 803, a first amplitude quantity calculation block 804a, an amplitude ratio calculation block 805, a frequency analysis block 806, a second flow rate characteristic adjustment block 809, and a flow rate correction filter 810.

(Microcomputer|Heating Element Control Processing Unit 830)

The heating element control processing unit 830 includes a heating element control external instruction reception unit 831 that receives instructions of the heating element control external instruction unit 201 included in the ECU 200, and a heating element control internal instruction unit 832. The heating element control internal instruction unit 832 instructs the heating element control internal instruction reception unit 833 to change the control state of the heating element 608 in accordance with the instruction of the heating element control external instruction unit 201 transmitted via the heating element control external instruction reception unit 831.

(Microcomputer|Heating Element Control Switching Control Processing Unit 837)

The heating element control switching control processing unit 837 monitors the instruction of the heating element control internal instruction unit 832, and detects a change from the heat generation suppression control state to the heat generation state and a change from the heat generation state to the heat generation suppression state. Next, the heating element control switching control processing unit 837 determines which of the first to third states to be described below corresponds to the current state. Further, the heating element control switching control processing unit 837 transmits the determined state to the frequency analysis block 806. Hereinafter, the change of the instruction of the heating element control internal instruction unit 832 from the heat generation suppression state to the heat generation state, and the change from the heat generation state to the heat generation suppression state are also referred to as "event".

A first state is a state within a predetermined period Tres immediately after the change from the heat generation suppression state to the heat generation state is detected. A second state is a state within a predetermined period Tres immediately after the change from the heat generation state to the heat generation suppression state is detected. A third state is another state, in other words, a state which passes longer than a predetermined period Tres after the change from the heat generation suppression state to the heat generation suppression state is detected, and passes longer than a predetermined period Tres after the change from the heat generation state to the heat generation suppression state is detected. The predetermined period Tres is a period obtained from the temperature response of the heating element 608 and the flow rate detection bridge 650, and information thereof is stored in the microcomputer 415 which is calculated by an experiment performed in advance.

(Microcomputer|First Flow Rate Characteristic Adjustment Block 800)

The first flow rate characteristic adjustment block 800 gives a desired characteristics to the flow rate signal that is output from the flow rate detection circuit 601. The first flow rate characteristic adjustment block 800 outputs the flow rate value, to which characteristics are given, to the first flow rate buffer 801 and the second flow rate buffer 802, the first filter selection unit 807, the moving average filter 811 and the low-pass filter 812, and a pulsation error reduction filter 813.

Figure 4:
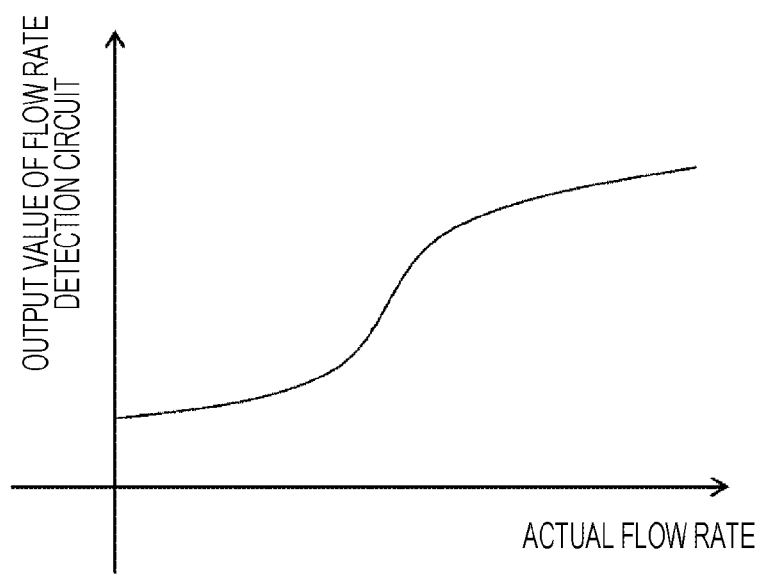
FIG. 4 is a diagram showing output characteristics of a flow rate detection circuit 601.
Figure 5:
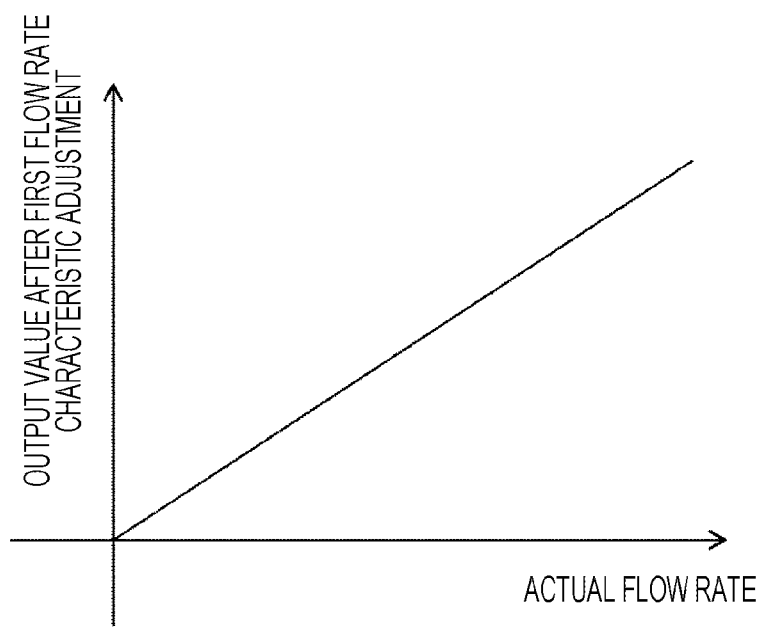
FIG. 5 is a diagram showing output characteristics of a first flow rate characteristic adjustment block 800.

FIGS. 4 and 5 are diagrams for explaining the operation of the first flow rate characteristic adjustment block 800. FIG. 4 is a diagram showing the output characteristics of the flow rate detection circuit 601, and FIG. 5 is a diagram showing the output characteristics of the first flow rate characteristic adjustment block 800. As shown in FIG. 4, the output of the flow rate detection circuit 601 has a tendency of monotonic increase with respect to an increase in actual flow rate. However, the increase width of the output of the flow rate detection circuit 601 is not always constant with respect to the increase width of the actual flow rate, and interferes with the processing in the microcomputer 415. Therefore, the first flow rate characteristic adjustment block 800 gives desired characteristics to the flow rate signal that is output from the flow rate detection circuit 601 to have the characteristics shown in FIG. 5.

(Microcomputer|First Flow Rate Buffer 801)

The first flow rate buffer 801 temporarily stores the output value of the first flow rate characteristic adjustment block 800. The first flow rate buffer 801 holds the flow rate value converted by the first flow rate characteristic adjustment block 800 by the flow rate of at least the pulsating cycle or more from the latest output. The pulsating cycle of the flow rate is obtained by the calculation of the frequency analysis block 806 to be described later.

(Microcomputer|Second Flow Rate Buffer 802)

The second flow rate buffer 802 holds the flow rate of at least the pulsating cycle or more from the latest output. However, the size of the second flow rate buffer 802 may be the same as or different from that of the first flow rate buffer 801. The second flow rate buffer 802 deletes the old output value when the number of stored output values exceeds a predetermined number. Hereinafter, the time during which overall information stored in the second flow rate buffer 802 is replaced is referred to as a "second buffer time". In other words, the second flow rate buffer 802 stores the output value of the first flow rate characteristic adjustment block 800 after the time which goes back by the second buffer time from the current time.

(Microcomputer|Average Flow Rate Calculation Block 803)

The average flow rate calculation block 803 refers to the first flow rate buffer 801 and calculates an average value of the output values of the first flow rate characteristic adjustment block 800. The average flow rate calculation block 803 outputs the calculation result to the amplitude ratio calculation block 805, the second filter selection unit 808, and the pulsation error reduction filter 813.

(Microcomputer|First Amplitude Quantity Calculation Block 804a)

The first amplitude quantity calculation block 804a calculate a difference between a maximum value of the flow rate value stored in the first flow rate buffer 801 and a minimum value of the flow rate value stored in the first flow rate buffer 801, as an amplitude quantity. The first amplitude quantity calculation block 804a outputs the calculation result to the amplitude ratio calculation block 805.

(Microcomputer|Amplitude Ratio Calculation Block 805)

The amplitude ratio calculation block 805 calculates the amplitude ratio by dividing the amplitude quantity calculated by the first amplitude quantity calculation block 804a by the flow average value calculated by the average flow rate calculation block 803. The amplitude ratio calculation block 805 outputs the calculation result to the first filter selection unit 807 and the pulsation error reduction filter 813.

(Microcomputer|Frequency Analysis Block 806)

The frequency analysis block 806 performs two operations based on the output of the heating element control switching control processing unit 837. The frequency analysis block 806 performs a major operation when the output of the heating element control switching control processing unit 837 is in the third state, and the frequency analysis block 806 performs a secondary operation when the output of the heating element control switching control processing unit 837 is in the first state or the second state. The major operation of the frequency analysis block 806 is to obtain a spectrum for each analysis frequency by performing a discrete Fourier transform on the flow rate value stored in the second flow rate buffer 802, and output the pulsating frequency as described later. The secondary operation is to repeatedly output the pulsating frequency that has been output immediately before.

The details of the major operations will be described. The analysis frequency in the major operation is determined on the basis of the characteristics of the measurement target fluid, which is a measurement target of the known physical quantity detection device 300. For example, when the measurement target fluid is exhaust of the engine, the measurement frequency is calculated from the number of cylinders of the engine and the range of the engine speed. Further, the power spectrum density for each analysis frequency obtained is referred to, and the dominant frequency, that is, the frequency having the maximum power spectrum density is set as the pulsating frequency of the measurement target gas. A reciprocal of the pulsating frequency is the pulsating cycle that determines the number of flow rate values temporarily recorded by the first flow rate buffer 801 and the second flow rate buffer 802. The frequency analysis block 806 outputs the pulsating frequency to the first filter selection unit 807 and the pulsation error reduction filter 813, and records the latest pulsating frequency in a temporary storage region (not shown).

The frequency analysis block 806 reads and outputs the pulsating frequency from the above-mentioned temporary storage region, when performing the secondary operation. However, when the first filter selection unit 807 and the pulsation error reduction filter 813 acquire information of the pulsating frequency by reading the data of the predetermined region on the memory, the frequency analysis block 806 may not perform any processing as a secondary operation. This is because the data written on the memory is due to the major operation, and the written data is not erased unless a new write is performed.

(Microcomputer|Second Flow Rate Characteristic Adjustment Block 809)

The second flow rate characteristic adjustment block 809 gives desired characteristics to the output value after the flow rate correction filter to facilitate the calculation using the output of the physical quantity detection device 300 in a later process. That is, the calculation of the second flow rate characteristic adjustment block 809 also gives the characteristics depending on the ECU 200 in which the post-processing is executed.

(Microcomputer|Flow Rate Correction Filter 810)

The flow rate correction filter 810 includes a moving average filter 811, a low-pass filter 812, a first filter selection unit 807, a second filter selection unit 808, and a pulsation error reduction filter 813. The moving average filter 811 calculates the moving average with a predetermined number of samplings on the output of the first flow rate characteristic adjustment block 800 as the processing target, and outputs the moving average to the second filter selection unit 808. The low-pass filter 812 applies a predetermined low-pass filter to the output of the first flow rate characteristic adjustment block 800 as a processing target, and outputs the output to the second filter selection unit 808.

The first filter selection unit 807 compares the amplitude ratio calculated by the amplitude ratio calculation block 805 with an amplitude ratio threshold value 807a, and compares the pulsating frequency calculated by a frequency analysis block 806 with a frequency threshold value 807b. The first filter selection unit 807 outputs the output of any one of the first flow rate characteristic adjustment block 800, the second filter selection unit 808, and the pulsation error reduction filter 813 based on these comparisons to the second flow rate characteristic adjustment block 809. As a reminder, the first filter selection unit 807 may output the output of the first flow rate characteristic adjustment block 800 to the second flow rate characteristic adjustment block 809 as it is without passing through any filter.

When the amplitude ratio calculated by the amplitude ratio calculation block 805 is greater than the amplitude ratio threshold value 807a, and the pulsating frequency calculated by a frequency analysis block 806 is greater than the frequency threshold value 807b, the first filter selection unit 807 selects the output of the pulsation error reduction filter 813. When the amplitude ratio calculated by the amplitude ratio calculation block 805 is equal to or less than the amplitude ratio threshold value 807a, and the flow rate average value calculated by the average flow rate calculation block 803 is equal to or less than the frequency threshold value 807b, the first filter selection unit 807 selects the output of the second filter selection unit 808. When the amplitude ratio calculated by the amplitude ratio calculation block 805 is larger than the amplitude ratio threshold value 807a and the pulsating frequency calculated by a frequency analysis block 806 is equal to or less than the frequency threshold value 807b, and when the amplitude ratio calculated by the amplitude ratio calculation block 805 is equal to or less than the amplitude ratio threshold value 807a and the flow rate average value calculated by the average flow rate calculation block 803 is larger than the frequency threshold value 807b, the first filter selection unit 807 does not perform the filter processing. That is, in this case, the output of the first flow rate characteristic adjustment block 800 is output to the second flow rate characteristic adjustment block 809 as it is.

The second filter selection unit 808 compares the flow rate average value calculated by the average flow rate calculation block 803 with the flow rate threshold value 808a. The second filter selection unit 808 outputs the output of the low-pass filter 812 to the first filter selection unit 807, when the flow rate average value calculated by the average flow rate calculation block 803 is larger than the flow rate threshold value 808*a*. The second filter selection unit SOS outputs the output of the moving average filter 811 to the first filter selection unit 807, when the flow rate average value calculated by the average flow rate calculation block 803 is equal to or less than the flow rate threshold value 808*a*.

Figure 6:
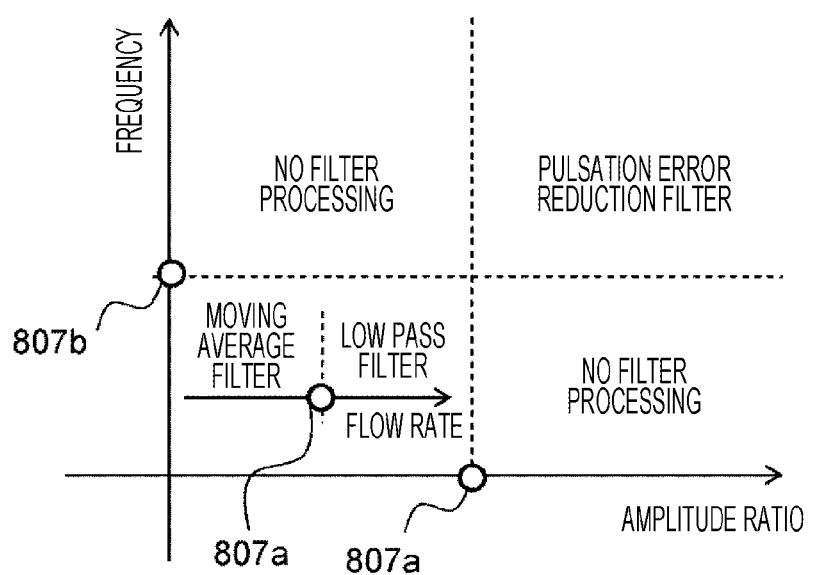
FIG. 6 is a diagram showing regions selected by a first filter selection unit 807 and a second filter selection unit 808 shown in FIG. 3.

FIG. 6 is a diagram showing selection of the first filter selection unit 807 and the second filter selection unit 808. In FIG. 6, a region is largely divided into four, and a lower left region is further divided into two. The first filter selection unit 807 determines which of the four large regions is selected, and the second filter selection unit 808 determines which of the two is selected in the lower left region. In this way, the two filter selection units evaluate a magnitude correlation between the amplitude ratio calculated by the amplitude ratio calculation block 805 and the amplitude ratio threshold value 807*a*, a magnitude correlation between the pulsating frequency calculated by a frequency analysis block 806 and the frequency threshold value 807*b*, and a magnitude correlation between the flow rate average value calculated by the average flow rate calculation block 803 and the flow rate threshold value 808*a*.

(Microcomputer|Pulsation Error Reduction Filter 813)

The pulsation error reduction filter 813 calculates a measured value obtained by reducing the influence of pulsation from the output of the first flow rate characteristic adjustment block 800, using the outputs of the average flow rate calculation block 803, the amplitude ratio calculation block 805, and the frequency analysis block 806, and outputs the measured value to the first filter selection unit 807. Specifically, the pulsation error reduction filter 813 outputs one in which a frequency characteristic correction flow rate and a flow rate dependence correction flow rate to be described below is added to the output of the first flow rate characteristic adjustment block 800.

The frequency characteristic correction flow rate is the product of the frequency characteristic gain and the output of the average flow rate calculation block 803. The frequency characteristic gain is determined on the basis of the output of the amplitude ratio calculation block 805 and the output of the frequency analysis block 806 by referring to a predetermined first table. In the first table, for example, the output of the amplitude ratio calculation block 805 is described on a horizontal axis, and the output of the frequency analysis block 806 is described on a vertical axis. Arbitrary interpolation operations such as proportional interpolation are performed as needed.

The flow rate dependence correction flow rate is the product of the fluctuation in the flow rate dependence correction gain and the frequency characteristic correction flow rate. The flow rate dependence correction gain is determined on the basis of the frequency characteristic correction flow rate and the output of the amplitude ratio calculation block 805 by referring to a predetermined second table. In the second table, for example, the frequency characteristic correction flow rate is described on a horizontal axis, and the output of the amplitude ratio calculation block 805 is described on a vertical axis.

Arbitrary interpolation operations such as proportional interpolation are performed as needed. The "fluctuation" of the flow rate dependence correction gain is a difference from 1, for example, when the flow rate dependence correction gain is "1.5", the fluctuation of the flow dependent correction gain are "0.5".

(Operation Example)

The physical quantity detection device 300 detects the intake air amount of the internal combustion engine. However, since the internal combustion engine may be stopped in a vehicle equipped with an idling stop function or a hybrid vehicle, there is a period at which the intake air does not exist. When the operation of the internal combustion engine is stopped, there is a risk of contamination of the flow rate detection bridge 650 due to the arrival of unburned gas from the internal combustion engine side to the physical quantity detection device 300. Further, in a hybrid vehicle or the like, it is conceivable to suppress the heat generation of the heating element 608, in order to prevent the waste of power consumption due to the heat generation of the heating element 608 in a state in which it is clear that the intake air does not exist. Although a problem may occur if the output of the flow rate detection circuit 601 is used as it is at the time of restarting of the operation of the internal combustion engine or the like, the physical quantity detection device 300 solves this problem.

Figure 7:
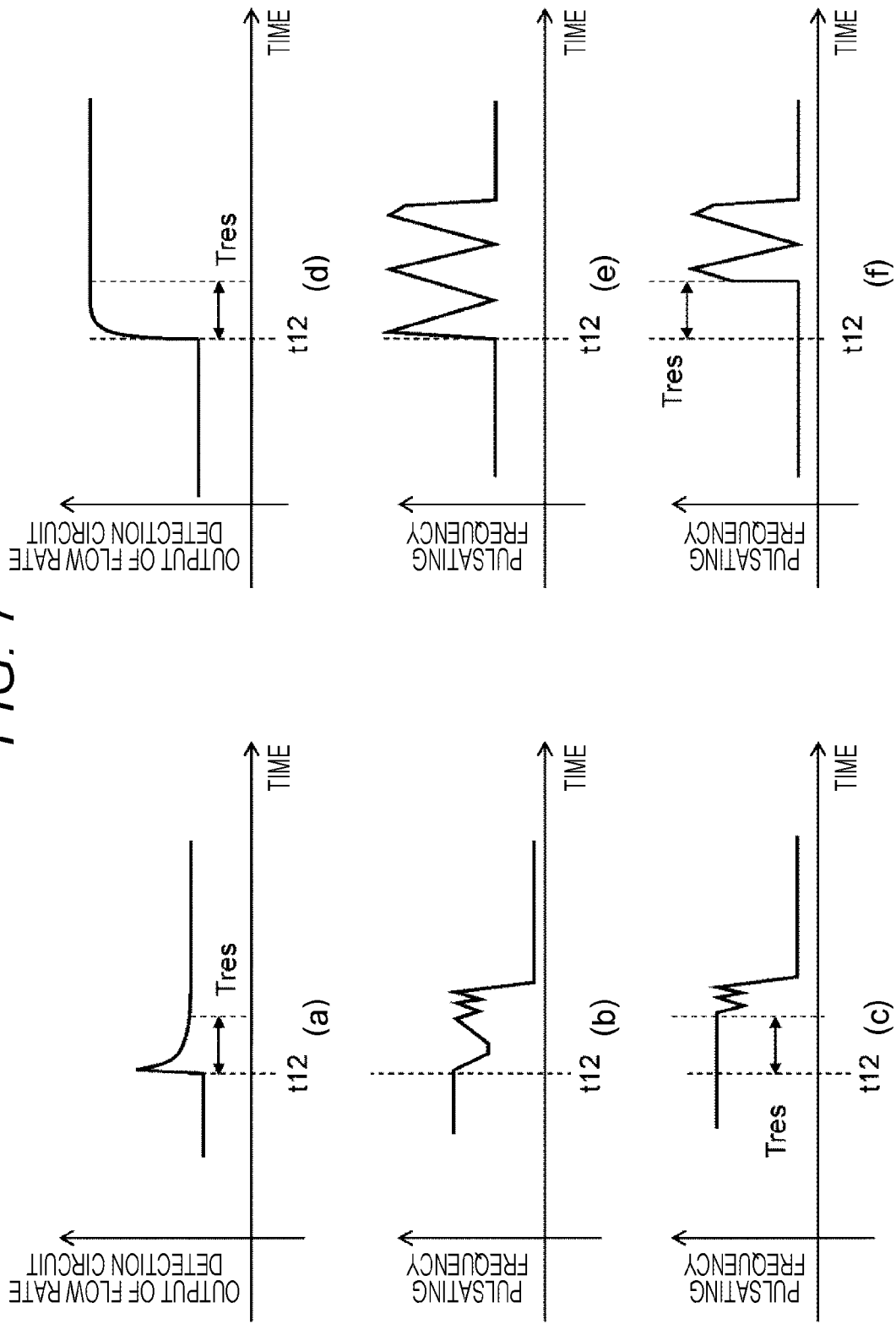
FIG. 7 is a diagram showing an operation example of the physical quantity detection device 300.

FIG. 7 is a diagram showing an operation example of the physical quantity detection device 300, specifically, an output of the frequency analysis block 806 of the physical quantity detection device 300. However, in order to explain the effect of the physical quantity detection device 300, the output of the flow rate detection circuit 601 and the result of simply performing the frequency analysis are also described together. In FIG. 7, a horizontal axis represents time. In FIG. 7, a time t12 represents the timing of switching from the heat generation state to the heat generation suppression state. Further, in FIGS. 7(*a*) to 7(*c*), the actual flow rate of the measurement target fluid is always zero in the range shown in the graph, and in FIGS. 7(*d*) to 7(*f*), the actual flow rate of the measurement target fluid is always a constant value in the range shown in the graph.

FIGS. 7(*a*) and 7(*d*) show the output of the flow rate detection circuit 601, FIGS. 7(*b*) and 7(*e*) show the results of a simple frequency analysis, and FIGS. 7(*c*) and 7(*f*) show the output of the frequency analysis block 806. The results of the simple frequency analysis shown in FIGS. 7(*b*) and 7(*e*) are pulsating frequencies when the frequency analysis is always performed ignoring the output of the heating element control switching control processing unit 837. The signal shown in FIG. 7(*a*) is input from the flow rate detection circuit 601 to the microcomputer 415, and the signal shown in FIG. 7(*c*) is output by processing of the heating element control switching control processing unit 837 and the frequency analysis block 806. The same also applies to a relationship between FIG. 7(*d*) and FIG. 7(*f*).

As shown in FIG. 7(*a*), when the control state of the heating element 608 is switched from the heat generation suppression state to the heat generation state in a state in which the actual flow rate of the measurement target fluid is zero, the flow rate measurement value greatly increases at the switching time t12, then gradually decreases and is set to a steady value. The period from the time t12 until the flow rate measurement value is set is Tres, and this period represents the temperature response between the heating element 608 and the flow rate detection bridge 650. The setting, for example, reaches the range of plus or minus 2% of the steady value.

In this case, when the calculation of the pulsating frequency by the frequency analysis block 806 is continued, the output repeatedly increases and decreases around the time t12 as shown in FIG. 7(*b*), and after a short time, it settles at a constant value. However, the frequency analysis block 806 changes the operation depending on the output of the heating element control switching control processing unit 837. In this example, the output of the heating element control switching control processing unit 837 is switched from the third state to the first state at the time t12. Therefore, the frequency analysis block 806 continues the output immediately before the time t12 from the time t12 to the period Tres. When the period Tres elapses from the time t12, since the output of the heating element control switching control processing unit 837 becomes the third state, the calculation is restarted and the calculation result is output. Therefore, it can be seen that FIG. 7(c) which is the output of the frequency analysis block 806 has a shorter period at which the output is not stable, as compared with FIG. 7(b) in which the calculation is continued.

Further, as shown in FIGS. 7(d) to 7(f), the same effect can be confirmed even when the flow rate of the measurement target fluid has a certain constant value. That is, the output of the flow rate detection circuit 601 gradually increases from the time t12 as shown in FIG. 7(d), and when the calculation is continued, the period at which the output is not stable is a long time as shown in FIG. 7(e). However, by stopping the calculation based on the output of the heating element control switching control processing unit 837, the period at which the output is not stable can be shortened as shown in FIG. 7(f).

According to the aforementioned first embodiment, the following effects can be obtained.

(1) The physical quantity detection device 300 includes a flow rate detection unit 602 that includes a heating element 608 and measures the flow rate of the measurement target fluid; a heating element control internal instruction reception unit 833 that switches the control state of the heating element 608 to a heat generation state and a heat generation suppression state; and a microcomputer 415 that includes a second flow rate buffer 802 and a frequency analysis block 806, and is a signal processing unit that processes a measured value of the flow rate detection unit 602, using the pulsating frequency calculated by the frequency analysis block 806. The measured values for the past predetermined period are recorded in the second flow rate buffer 802. The frequency analysis block 806 calculates the pulsating frequency by performing the frequency analysis of the measured value recorded in the second flow rate buffer 802. When the microcomputer 415 detects the switching of the control state by the heating element control internal instruction reception unit 833, the microcomputer 415 performs a calculation, using the pulsating frequency calculated immediately before, for a predetermined period Tres from the switching. Therefore, as shown in FIG. 7, it is possible to shorten the period at which the output is unstable after switching of the control state, and to reduce the decrease in measurement accuracy.

(2) When the switching of the control state by the heating element control internal instruction reception unit 833 is detected, the microcomputer 415 stops the operation of the frequency analysis block 806, and continuously uses the pulsating frequency immediately before the switching of the control state. Accordingly, the power consumption of the frequency analysis block 806 can be reduced.

(3) The microcomputer 415 performs the processing, using the calculated value of the frequency analysis block 806 after the lapse of the predetermined period Tres. Therefore, the microcomputer 415 can acquire the latest pulsating frequency and perform calculation based on the frequency.

(4) The predetermined period Tres is equal to or longer than the period required for the temperature response of the flow rate detection unit 602. Therefore, it is possible to reduce the degradation of accuracy by setting the period or higher required for the temperature response, which is a physical constraint, to the predetermined period Tres.

(5) The microcomputer 415 includes a heating element control external instruction reception unit 831 that receives a signal for controlling the heating element 608 from the outside. The heating element control internal instruction unit 832 changes the control state of the heating element 608 based on the operation command of the heating element control external instruction reception unit 831. Therefore, it is possible to appropriately save power according to the operation command of the device that uses the output of the physical quantity detection device 300. For example, when the ECU 200 that uses the output of the physical quantity detection device 300 does not refer to the output of the physical quantity detection device 300 for a certain period of time, by instructing the heat generation suppression state to the physical quantity detection device 300, unnecessary heating of the heating element 608 can be avoided.

Modified Example 1

In the aforementioned first embodiment, the microcomputer 415 includes a second filter selection unit 808 that selects one of the moving average filter 811 and the low-pass filter 812. However, the microcomputer 415 may include only one of the moving average filter 811 and the low-pass filter 812. In this case, the second filter selection unit 808 may also not be provided.

Modified Example 2

In the aforementioned first embodiment, the physical quantity detection device 300 measures the flow rate, temperature, pressure, and humidity. However, the physical quantity detection device 300 only has to measure at least the flow rate, and may not measure at least one of the other four physical quantities.

Modified Example 3

When the microcomputer 415 detects that the instruction of the heating element control internal instruction unit 832 is changed from the heat generation suppression state to the heat generation state, or from the heat generation state to the heat generation suppression state, the microcomputer 415 may continue the operation of the frequency analysis block 806, without updating the second flow rate buffer 802. For example, the first flow rate characteristic adjustment block 800 may refer to the output of the heating element control switching control processing unit 837, and output may be provided to the second flow rate buffer 802 only when the output is in the third state. In this case, since the operation of the frequency analysis block 806 continues, the logic for controlling the operation of the frequency analysis block 806 can be simplified and the design can be diversified.

Modified Example 4

The predetermined period Tres may be equal to or longer than the second buffer time, that is, the time at which all the data stored in the second flow rate buffer 802 are replaced. However, it is desirable that the predetermined period Tres be equal to or longer than the period required for the temperature response of the flow rate detection unit 602, and equal to or longer than the second buffer time. In a case where a predetermined period Tres is equal to or longer than the second buffer time, when the frequency analysis block 806 restarts the frequency analysis, since the previous measured value before the change of the control state does not remain in the second flow rate buffer 802, stable output is possible.

Modified Example 5

The frequency analysis block 806 may perform a major operation when the output of the heating element control switching control processing unit 837 is in the second state. In other words, the frequency analysis block 806 may repeatedly output the pulsating frequency, which is output immediately before, only within a predetermined period Tres immediately after detecting the change from the first state, that is, the heat generation suppression state to the heat generation state.

Second Embodiment

A second embodiment of the physical quantity detection device will be described referring to FIGS. 8 to 9.

In the following description, the same components as those in the first embodiment are designated by the same reference numerals, and the differences will be mainly described. Points, which are not particularly described, are the same as those in the first embodiment. This embodiment is different from the first embodiment mainly in that the heating element control processing unit 830 of the physical quantity detection device 300 does not include the heating element control external instruction reception unit 831.

Figure 8:
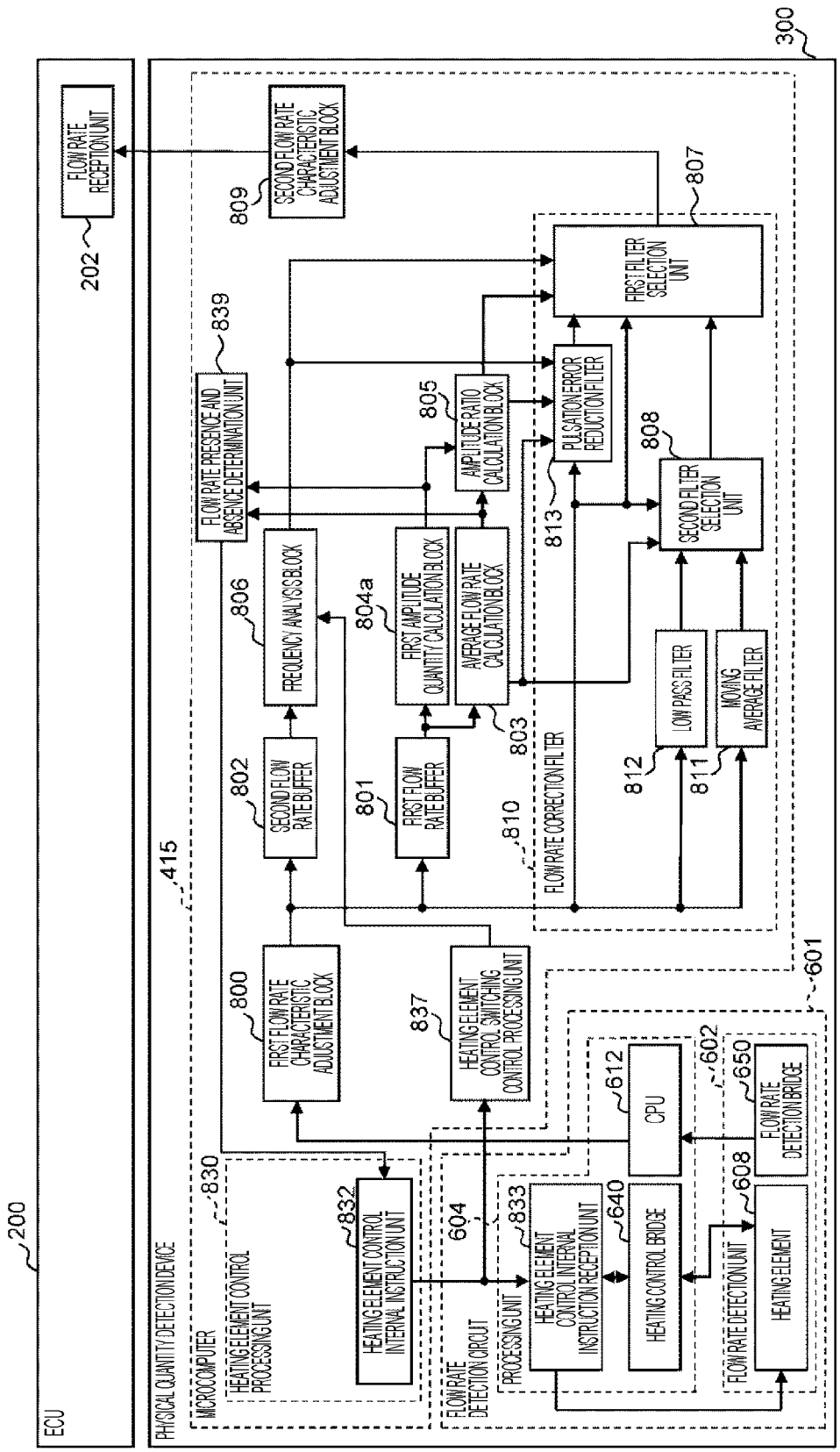
FIG. 8 is a diagram showing a configuration of an ECU 200 and a physical quantity detection device 300 according to a second embodiment.

FIG. 8 is a diagram showing a configuration of a physical quantity detection device 300 according to the second embodiment. A hardware configuration of the physical quantity detection device 300 in the present embodiment is the same as that in the first embodiment. A functional configuration of the physical quantity detection device 300 in the present embodiment is different from, that of the first embodiment in that the heating element control external instruction reception unit 831 is deleted, a flow rate presence and absence determination unit 839 is added, and operation of the heating element control internal instruction unit 832 is different.

The flow rate presence and absence determination unit 839 determines whether the flow rate detected by the flow rate detection unit 602 is a value indicating zero, in other words, whether the actual flow rate is zero, using the calculated value of the average flow rate calculation block 803 and the calculated value of the first amplitude quantity calculation block 804a. Further, the flow rate presence and absence determination unit 839 instructs the control of the heat generation state when it is determined that the actual flow rate is not zero, and instructs the control of the heat generation suppression state when it is determined that the actual flow rate is zero. The flow rate presence and absence determination unit 839 determines the presence and absence of the actual flow rate from the calculated value of the average flow rate calculation block 803 and the calculated value of the first amplitude quantity calculation block 804a as follows.

Figure 9:
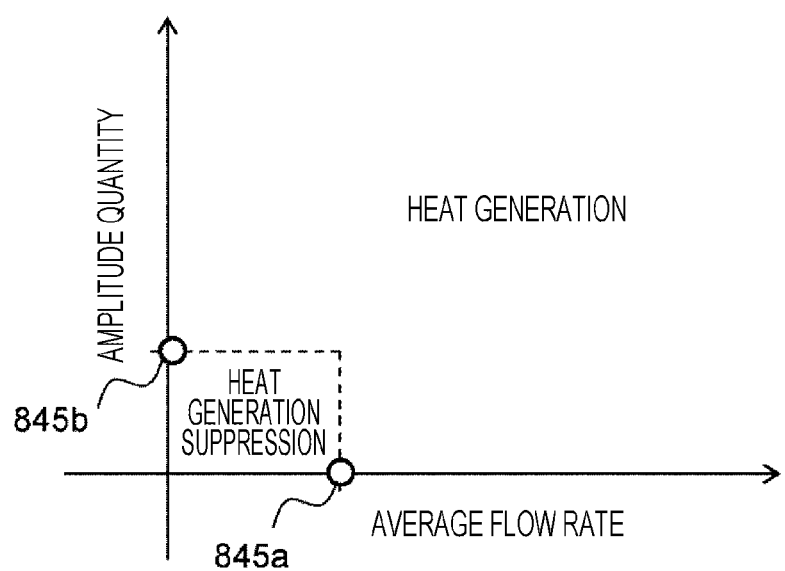
FIG. 9 is a diagram showing an outline of operation of a flow rate presence and absence determination unit 839.

FIG. 9 is a diagram showing an operation overview of the flow rate presence and absence determination unit 839. The flow rate presence and absence determination unit 839 compares the calculated value of the average flow rate calculation block 803 with the average flow rate threshold value 845a, and compares the calculated value of the first amplitude quantity calculation block 804a with the amplitude quantity threshold value 845b. Further, when it is determined that both calculated values are below the threshold value, the flow rate presence and absence determination unit 839 determines that the actual flow rate is zero and gives an instruction to control the heat generation suppression state. In other cases, the flow rate presence and absence determination unit 839 determines that the actual flow rate is not zero and gives an instruction to control the heat generation state. However, the presence and absence of the actual flow rate determined by the flow rate presence and absence determination unit 839 does not mean strict zero, but means "relatively small".

Specifically, when the average flow rate calculated by the average flow rate calculation block 803 is greater than the average flow rate threshold value 845a, or when the calculated value of the first amplitude quantity calculation block 804a is greater than the amplitude quantity threshold value 845b, the flow rate presence and absence determination unit 839 determines that the actual flow rate is not zero, and instructs the heating element control internal instruction unit 832 to control the heat generation state. When the average flow rate calculated by the average flow rate calculation block 803 is equal to or less than the average flow rate threshold value 845a and the calculated value of the first amplitude quantity calculation block 804a is equal to or less than the amplitude quantity threshold value 845b, the flow rate presence and absence determination unit 839 determines that the actual flow rate is zero, and instructs the heating element control internal instruction unit 832 to control the heat generation suppression state.

According to the aforementioned second embodiment, the following effects can be obtained.

(6) The physical quantity detection device 300 includes the first flow rate buffer 801, the average flow rate calculation block 803, the first amplitude quantity calculation block 804a, and the flow rate presence and absence determination unit 839 that determines the presence and absence of the flow rate of the measurement target fluid, and outputs an operation command to the heat generation control bridge 640 and the CPU 612 via the heating element control internal instruction unit 832. The heat generation control bridge 640 and the CPU 612 operate on the basis of the operation command of the flow rate presence and absence determination unit 389. When the average flow rate is equal to or less than the average flow rate threshold value 845a and the amplitude quantity is equal to or less than the amplitude quantity threshold value 845b, the flow rate presence and absence determination unit 839 determines that the flow rate of the measurement target fluid is zero and is controlled to become the heat generation suppression state. When the average flow rate is greater than the average flow rate threshold value 845a or when the amplitude quantity is greater than the amplitude quantity threshold value 845b, the flow rate presence and absence determination unit 839 determines that the flow rate of the measurement target fluid is not zero, and is controlled to become the heat generation state. Therefore, since the physical quantity detection device 300 controls the heating element 608 without receiving an operation instruction from the external ECU 200, the control based on the actual environment can be performed, and further improvement in stain resistance and further power-saving of the flow rate detection bridge 650 are realized.

Third Embodiment

A third embodiment of the physical quantity detection device will be described referring to FIG. 10. In the following description, the same components as those of the first embodiment and the second embodiment are designated by the same reference numerals, and the differences will be mainly described. Points, which are not particularly described, are the same as those in the first embodiment. This embodiment is mainly different from the second embodiment in that it includes a heating element control external instruction reception unit 831.

Figure 10:
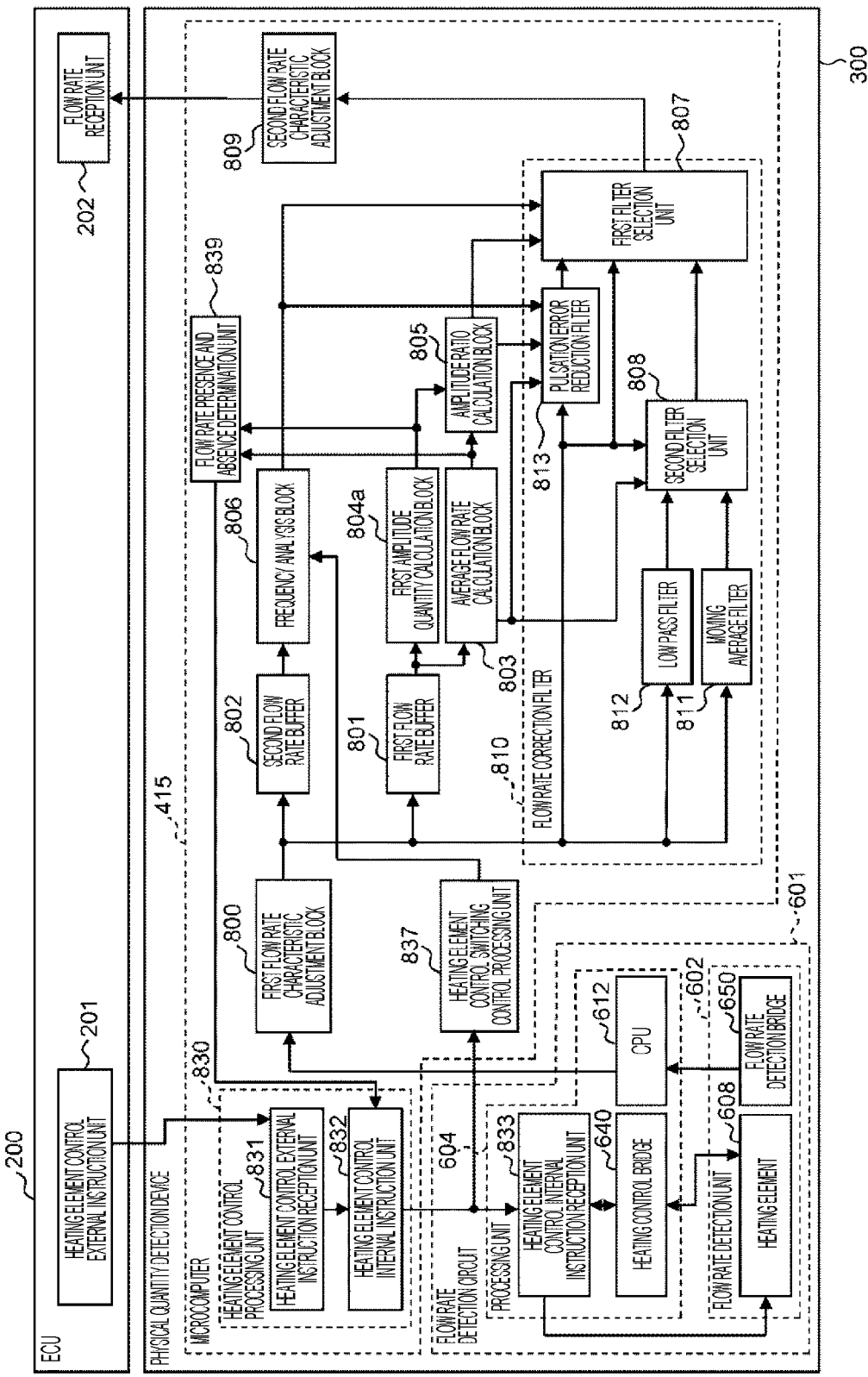
FIG. 10 is a diagram showing a configuration of an ECU 200 and a physical quantity detection device 300 according to a third embodiment.

FIG. 10 is a diagram showing a configuration of a physical quantity detection device 300 according to the third embodiment. A hardware configuration of the physical quantity detection device 300 in the present embodiment is the same as that of the third embodiment. The functional configuration of the physical quantity detection device 300 in the present embodiment is different from that of the third embodiment in that a heating element control external instruction reception unit 831 is added and the operation of the heating element control internal instruction unit 832 is different.

The operation of the heating element control external instruction reception unit 831 is the same as that of the first embodiment. The heating element control internal instruction unit 832 instructs the heating element control internal instruction reception unit 833 to change the control state of the heating element 608, in accordance with the instruction of the heating element control external instruction unit 201 transmitted via the heating element control external instruction reception unit 831 and the instruction of the flow rate presence and absence determination unit 839. When the instruction of the heating element control external instruction unit 201 and the instruction of the flow rate presence and absence determination unit 839 are different from each other, the heating element control internal instruction unit 832 gives priority to the instruction of the heating element control external instruction unit 201.

According to the aforementioned third embodiment, the physical quantity detection device can be used not only by being connected to an ECU equipped with the heating element control external instruction unit 201, but also by being connected to an ECU not equipped with the heating element control external instruction unit 201. Further, when the ECU to be connected includes the heating element control external instruction unit 201, since the instruction of the ECU is prioritized for the operation of the heating element 608, power saving based on the operation of the ECU can be achieved.

(Modified Example of Third Embodiment)

In the aforementioned third embodiment, when the instruction of the heating element control external instruction unit 201 and the instruction of the flow rate presence and absence determination unit 839 are different from each other, the heating element control internal instruction unit 832 gave priority to the instruction of the heating element control external instruction unit 201. However, when the instruction of the heating element control external instruction unit 201 and the instruction of the flow rate presence and absence determination unit 839 are different from each other, the heating element control internal instruction unit 832 may give priority to the instruction of the flow rate presence and absence determination unit 839. According to this modified example, since the transition into the heat generation suppression state is performed by the determination of the flow rate presence and absence determination unit 839, the power consumption of the physical quantity detection device 300 can be suppressed.

Fourth Embodiment

A fourth embodiment of the physical quantity detection device will be described referring to FIG. 11. In the following description, the same components as those in the first to third embodiments are denoted by the same reference numerals, and the differences will be mainly described. The points, which are not particularly described, are the same as those in the third embodiment. The present embodiment is mainly different from the third embodiment in that an amplitude quantity determination unit 860 is also provided so that the frequency analysis is not performed even when a change in flow rate is large.

Figure 11:
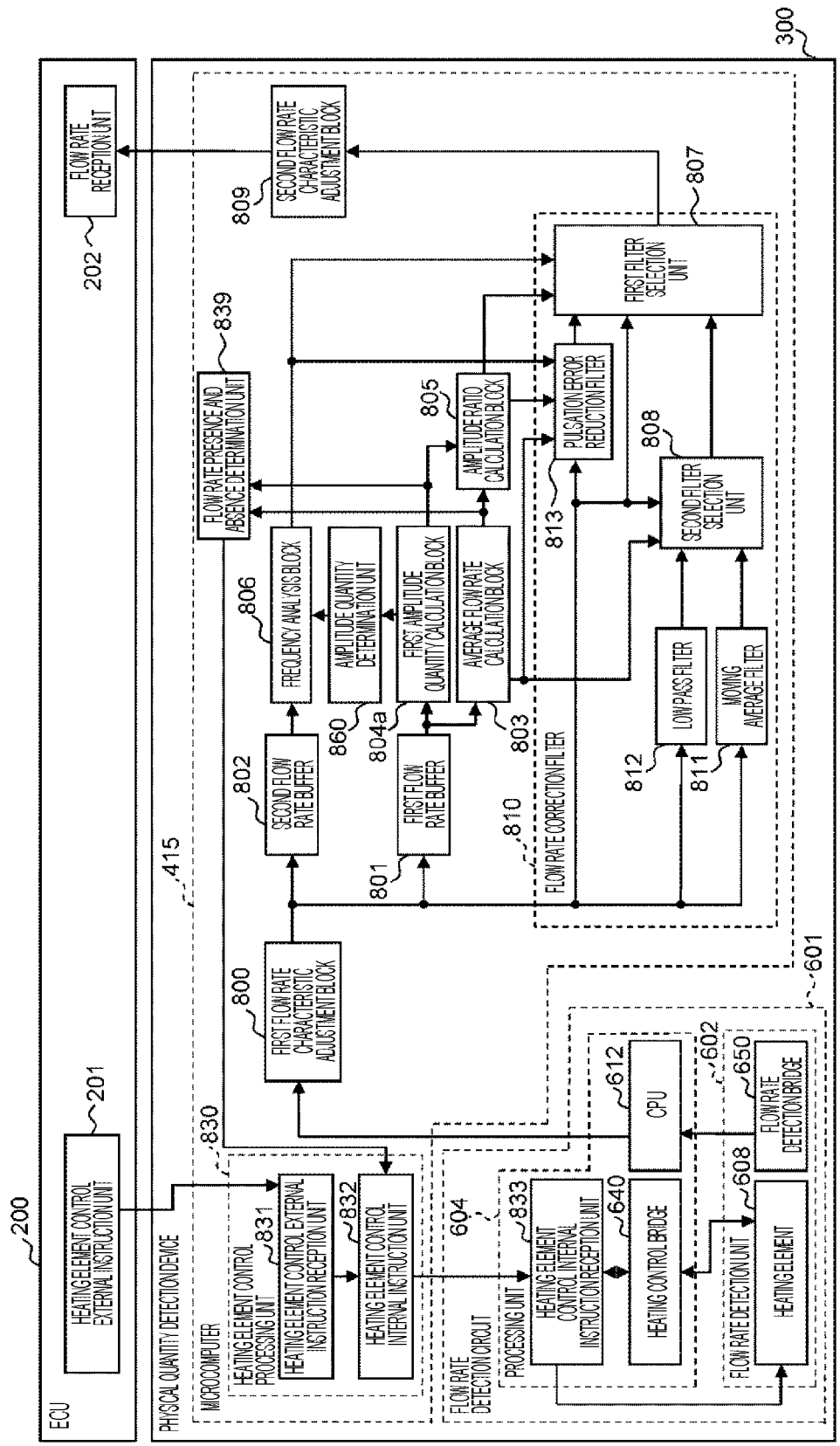
FIG. 11 is a diagram showing a configuration of an ECU 200 and a physical quantity detection device 300 according to a fourth embodiment.

FIG. 11 is a diagram showing the configuration of the physical quantity detection device 300 according to the fourth embodiment. A hardware configuration of the physical quantity detection device 300 in the present embodiment is the same as that of the third embodiment. A functional configuration of the physical quantity detection device 300 in the present embodiment is different from that of the third embodiment in that the amplitude quantity determination unit 860 is further provided.

(Microcomputer|Amplitude Quantity Determination Unit 860)

The amplitude quantity determination unit 860 determines whether the amplitude quantity, which is the output of the first amplitude quantity calculation block 804*a*, is greater than a predetermined threshold value, and outputs the determination result thereof to the frequency analysis block 806. For example, the amplitude quantity determination unit 860 outputs a signal indicating an excessive amplitude when the amplitude quantity is greater than a predetermined threshold value, and does not output a signal indicating an excessive amplitude when the amplitude quantity is equal to or less than a predetermined threshold value. In the present embodiment, the fact that the amplitude quantity, which is the output of the first amplitude quantity calculation block 804*a*, is greater than a predetermined threshold value, in other words, that the measured value suddenly changes, is also said that an "event" occurs.

The frequency analysis block 806 performs the secondary operation, even within the period at which the amplitude quantity determination unit 860 outputs the signal having an excessive amplitude, and within the second buffer time after the output of the signal having an excessive amplitude is finished. In other words, the amplitude quantity determination unit 860 performs the secondary operation, in a case corresponding to any one of a case where the output of the heating element control switching control processing unit 837 is in the first state, a case where the output of the heating element control switching control processing unit 837 is in the second state, a case where the amplitude quantity determination unit 860 outputs a signal having an excessive amplitude, and a case where the amplitude quantity determination unit 860 is within the second buffer time after the output of the signal having the excessive amplitude is finished.

According to the aforementioned fourth embodiment, the following operational effects can be obtained in addition to the first embodiment. That is, even when the measured value changes abruptly, since the frequency analysis block 806 repeatedly outputs the pulsating frequency calculated immediately before, it is possible to shorten the period during which the output is unstable after switching the control state, and to reduce degradation of the measurement accuracy.

Fifth Embodiment

A fifth embodiment of the physical quantity detection device will be described referring to FIG. 12. In the following description, the same components as those in the first to fourth embodiments are denoted by the same reference numerals, and the differences will be mainly described. The points, which are not particularly described, are the same as those in the fourth embodiment. This embodiment is mainly different from the fourth embodiment in that it includes a second amplitude quantity calculation block 861.

Figure 12:
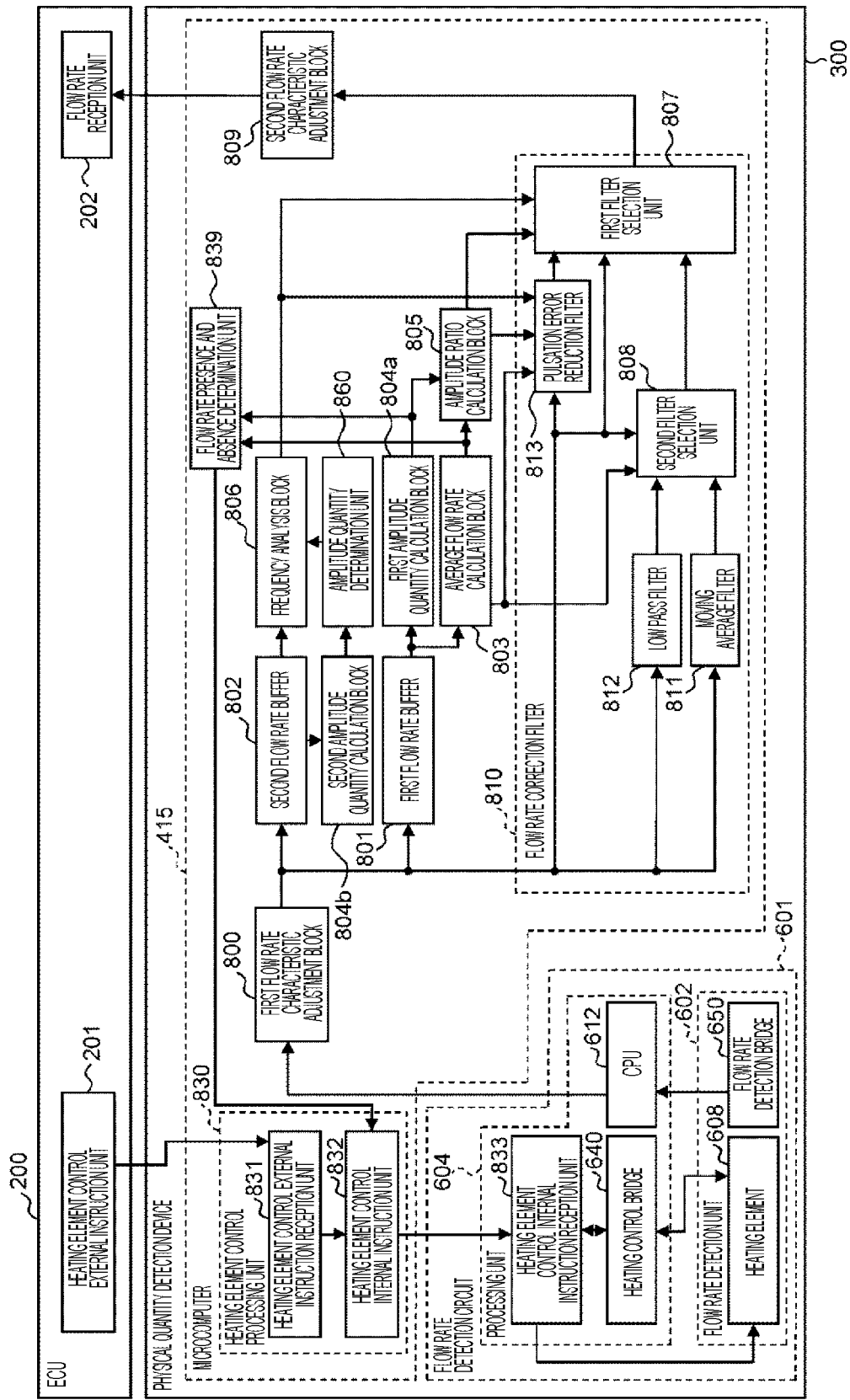
FIG. 12 is a diagram showing a configuration of an ECU 200 and a physical quantity detection device 300 according to a fifth embodiment.

FIG. 12 is a diagram showing a configuration of the physical quantity detection device 300 according to the fifth embodiment. A hardware configuration of the physical quantity detection device 300 in the present embodiment is the same as that in the fourth embodiment. A functional configuration of the physical quantity detection device 300 in the present embodiment is different from that of the fourth embodiment in that a second amplitude quantity calculation block 804*b* is further provided. The second amplitude quantity calculation block 804*b* calculates a difference between a maximum value of the flow rate value stored in the second flow rate buffer 802 and a minimum value of the flow rate value stored in the second flow rate buffer 802 as an amplitude quantity, and outputs it to the amplitude quantity determination unit 860.

In the present embodiment, the amplitude quantity determination unit 860 determines whether the output of the second amplitude quantity calculation block 804*b* rather than the output of the first amplitude quantity calculation block 804*a* is greater than the predetermined threshold value, and outputs the determination result to the frequency analysis block 806. The operation of the frequency analysis block 806 is as in the fourth embodiment. In the present embodiment, a state, in which the amplitude quantity which is the output of the second amplitude quantity calculation block 804*b* is greater than a predetermined threshold value, is also said that an "event" occurs.

Each of the aforementioned embodiments and modified example may be combined with each other. Although various embodiments and modified examples have been described above, the present invention is not limited to contents thereof. Other aspects conceivable within the scope of the technical idea of the present invention are also included within the scope of the present invention.

REFERENCE SIGNS LIST 300 physical quantity detection device
415 microcomputer
601 flow rate detection circuit
602 flow rate detection unit
604 processing unit
608 heating element
640 heat generation control bridge
650 flow rate detection bridge
803 average flow rate calculation block
804*a* first amplitude quantity calculation block
804*b* second amplitude quantity calculation block
805 amplitude ratio calculation block
806 frequency analysis block
810 flow rate correction filter
811 moving average filter
812 low-pass filter
813 pulsation error reduction filter
830 heating element control processing unit
831 heating element control external instruction reception unit
832 heating element control internal indicating unit
833 heating element control internal instruction reception unit
837 heating element control switching control processing unit
839 flow rate presence and absence determination unit
860 amplitude quantity determination unit

The invention claimed is:

1. A physical quantity detection device comprising:
a flow rate measuring element which is equipped with a heating element and measures a flow rate of a measurement target fluid;
a controller which switches a control state of the heating element to one of a heat generation state or a heat generation suppression state; and
a signal processing unit which includes a buffer and a frequency analysis block and processes a measured value of the flow rate measuring element, using a main frequency calculated by the frequency analysis block, wherein:
the measured value for a past predetermined period is recorded in the buffer,
the frequency analysis block calculates the main frequency by performing a frequency analysis of the measured value recorded in the buffer,
when an occurrence of an event is detected, the signal processing unit performs a calculation of a physical quantity, using the main frequency calculated before for a predetermined period after the occurrence of the event, wherein the predetermined period is determined based at least in part on a temperature response of the flow rate measuring element or data stored in the buffer, and
the controller switches the control state of the heating element.

2. The physical quantity detection device according to claim 1,
wherein when the occurrence of the event is detected, the signal processing unit continues an operation of the frequency analysis block without updating the buffer, or stops the operation of the frequency analysis block and continuously uses the main frequency immediately before the event occurs.

3. The physical quantity detection device according to claim 1,
wherein the signal processing unit performs the calculation of the physical quantity, using a calculated value of the frequency analysis block after lapse of the predetermined period.

4. The physical quantity detection device according to claim 1,
wherein the predetermined period is equal to or longer than a period required for the temperature response of the flow rate measuring element.

5. The physical quantity detection device according to claim 1,
wherein the predetermined period is equal to or longer than a period during which the buffer is updated.

6. The physical quantity detection device according to claim 1,
wherein the controller receives a signal for controlling the heating element, and changes the control state of the heating element on the basis of the signal.

7. The physical quantity detection device according to claim 1, further comprising:
a second buffer which temporarily records measured values for the past predetermined period;
an average flow rate calculation block which calculates an average flow rate, which is an average of flow rate, using the measured values in the second buffer;

an amplitude quantity calculation block which calculates an amplitude quantity, which is an amplitude of the flow rate, using the measured values in the second buffer; and a circuit which determines presence and absence of the flow rate of the measurement target fluid and outputs an operation command to the controller, wherein the controller operates on the basis of the operation command, and when the average flow rate is equal to or less than a predetermined first threshold value and the amplitude quantity is equal to or less than a predetermined second threshold value, the circuit determines that the flow rate of the measurement target fluid is zero, and causes the controller to switch the control state to the heat generation suppression state, and when the average flow rate is larger than the predetermined first threshold value, or when the amplitude quantity is larger than the predetermined second threshold value, the circuit determines that the flow rate of the measurement target fluid is not zero, and causes the controller to switch the control state to the heat generation state.

8. The physical quantity detection device according to claim 1, further comprising:
a second buffer which temporarily records measured values for the past predetermined period;
an average flow rate calculation block which calculates the average flow rate, which is an average of flow rate, using the measured values in to the second buffer;
an amplitude quantity calculation block which calculates an amplitude quantity, which is an amplitude of the flow rate, using the measured values in the second buffer; and
a circuit which determines the presence and absence of the flow rate of the measurement target fluid and outputs an operation command to the controller, wherein:
the controller receives a signal for controlling the heating element and operates on the basis of the signal and the operation command, and
when the average flow rate is equal to or less than a predetermined first threshold value and the amplitude quantity is equal to or less than a predetermined second threshold value, the circuit determines that the flow rate of the measurement target fluid is zero, and causes the controller to switch the control state to the heat generation suppression state, and
when the average flow rate is larger than the predetermined first threshold value or when the amplitude quantity is larger than the predetermined second threshold value, the circuit determines that the flow rate of the measurement target fluid is not zero and causes the controller to switch the control state to the heat generation state.

9. The physical quantity detection device according to claim 8,
wherein the controller prioritizes the signal over the operation command.

* * * * *